(12) United States Patent
Talboom

(10) Patent No.: US 6,495,033 B1
(45) Date of Patent: Dec. 17, 2002

(54) DEVICE FOR SEPARATING TWO NON-MIXABLE LIQUIDS WITH DIFFERENT SPECIFIC GRAVITIES

(75) Inventor: Bart Anton Lode Talboom, KonTich (BE)

(73) Assignee: Atlas Copco Airpower, naamloze vennootschap, Wilrijk (BE)

( * ) Notice: Subject to any disclaimer, the term of this patent is extended or adjusted under 35 U.S.C. 154(b) by 0 days.

(21) Appl. No.: 09/673,258

(22) PCT Filed: May 4, 1999

(86) PCT No.: PCT/BE99/00054
§ 371 (c)(1),
(2), (4) Date: Oct. 26, 2000

(87) PCT Pub. No.: WO99/58219
PCT Pub. Date: Nov. 18, 1999

(30) Foreign Application Priority Data

May 12, 1998 (BE) .............................................. 9800352

(51) Int. Cl.[7] .............................................. B01D 17/028
(52) U.S. Cl. .................... 210/168; 210/171; 210/255; 210/262; 210/265; 210/416.5; 210/521; 210/532.1; 210/540; 210/DIG. 5
(58) Field of Search ................................ 210/168, 171, 210/255, 262, 265, 416.5, 532.1, 521, 540, DIG. 5

(56) References Cited

U.S. PATENT DOCUMENTS

| | | | |
|---|---|---|---|
| 3,352,778 A | * | 11/1967 | Brintz, Jr. et al. |
| 3,417,015 A | * | 12/1968 | Canevari et al. |
| 4,011,158 A | | 3/1977 | Cook .......................... 210/259 |
| 5,017,294 A | * | 5/1991 | Durrieu ....................... 210/708 |
| 5,039,425 A | * | 8/1991 | Caris et al. |
| 5,207,895 A | | 5/1993 | Basseen et al. ............... 210/95 |

FOREIGN PATENT DOCUMENTS

| | | |
|---|---|---|
| CH | 579 939 A | 9/1976 |
| DE | 15 17 648 A | 4/1969 |
| DE | 28 08 657 A | 9/1979 |
| DE | 295 03 925 U | 5/1995 |
| EP | 0 148 444 A | 7/1985 |
| EP | 0 389 346 A | 9/1990 |
| EP | 0 436 773 A | 7/1991 |
| FR | 677 072 A | 3/1930 |
| FR | 1 489 522 A | 11/1967 |
| FR | 1 545 197 A | 11/1968 |
| FR | 2 621 306 A | 4/1989 |

* cited by examiner

Primary Examiner—Robert J. Popovics
(74) Attorney, Agent, or Firm—Bacon & Thomas

(57) ABSTRACT

Device for separating two non-mixable liquids with different specific gravities such as oil and water, which device contains a first separation tank (2) with an overflow (11, 12) for each of the liquids to be separated, a coalescence filter (3) whose inlet (14) is connected via a pipe (13) to the overflow (12) of the first separation tank (2) for the liquid with the highest specific gravity and a second separation tank (4) which is connected to the outlet (19) of the coalescence filter (3), characterized in that the overflow (12) onto which the coalescence filter (3) is connected is situated higher than the inlet (14) of the coalescence filter (3) with a difference in height H1 which is such that the liquid mass in the pipe between the first separation tank (2) and the coalescence filter (3) provides for the necessary pressure to bridge the pressure drop in the coalescence filter (3) and the counter-pressure of the liquid in the second separation tank (4).

13 Claims, 1 Drawing Sheet

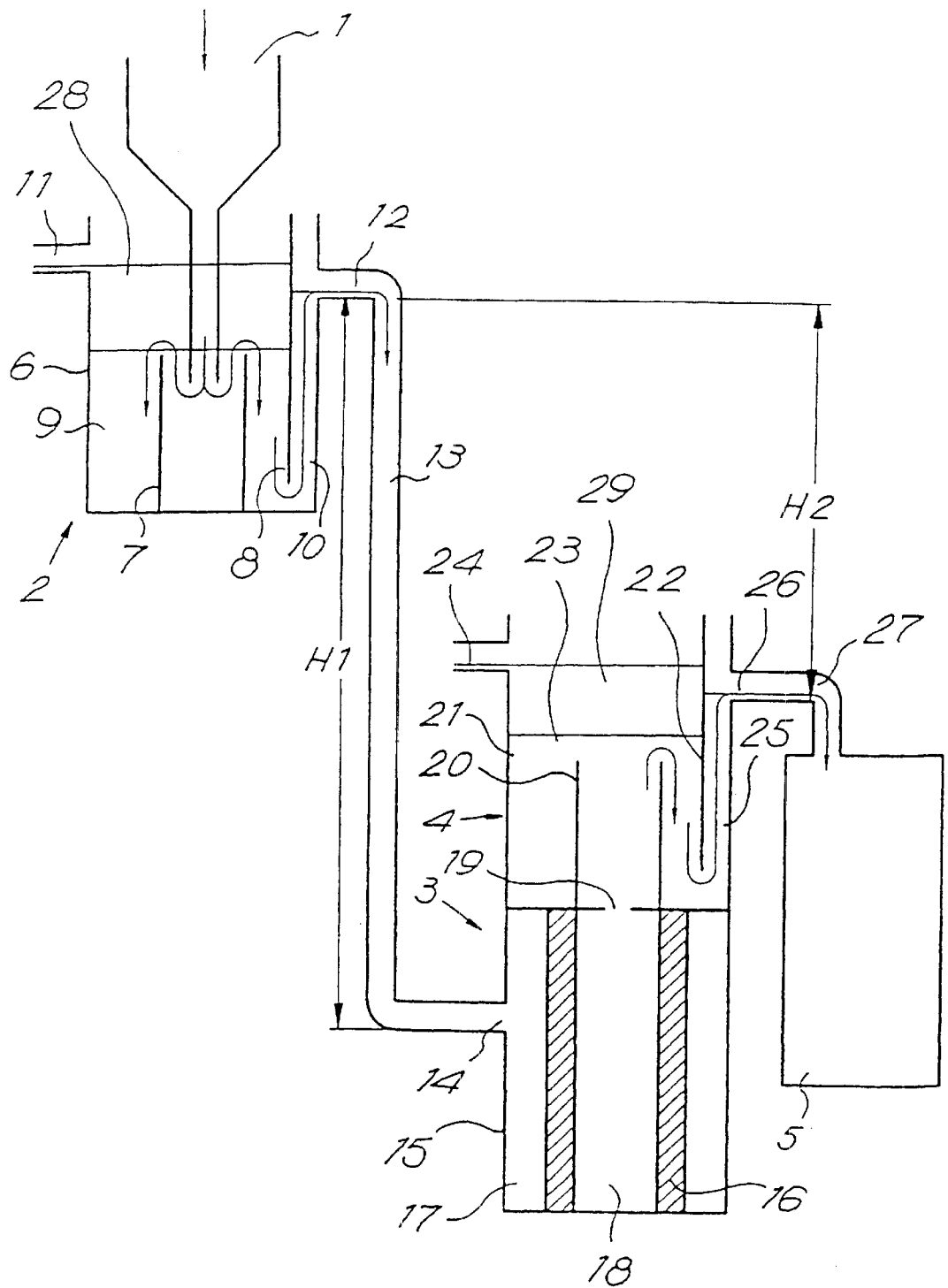

DEVICE FOR SEPARATING TWO NON-MIXABLE LIQUIDS WITH DIFFERENT SPECIFIC GRAVITIES

The present invention concerns a device for separating two non-mixable liquids with different specific gravities such as oil and water, in particular for separating oil from the condensate of a compressor installation, which device contains a first separation tank with an overflow for each of the liquids to be separated, a coalescence filter whose inlet is connected via a pipe to the overflow of the first separation tank for the liquid with the highest specific gravity and a second separation tank which is connected to the outlet of the coalescence filter.

Such devices are used in installations with oil-lubricated compressors and related appliances such as compressed air dryers, pressure vessels and filters, and they are erected after the condensate separators of these appliances.

The pre-separator or separation tank operates on the basis of the difference of the specific gravities. In this separation tank, the floating heavy oil emulsion and free oil are separated. The coalescence filter contains a filter medium through which flows the condensate and in which the fine, emulgated oil drops glue together into larger drops which are separated from the water in a second separation tank connected onto it as a result of the difference in specific gravity.

In some cases, namely when only a very restricted residual oil content is admitted, also an active carbon filter will be erected after the separation tank in which the oil remaining after the coalescence filter is adsorbed on the surface of the active carbon.

Such devices are known operating on atmospheric pressure. They are characterised by a coalescence filter which is little efficient, so that the emphasis lies mainly on the pre-separation and the active carbon filter. As the coalescence filter is little efficient, the active carbon filter is rapidly saturated and has to be replaced soon.

That is why, in order to reduce the residual oil which must be adsorbed on the active carbon, the pre-separation of the oil must be as efficient as possible. Therefore, the first separator is built relatively large, so that the condensate remains as long as possible in this separator.

Also the amount of active carbon is selected relatively large, so as to keep as much time as possible between the replacements.

By pressing the condensate under pressure through the coalescence filter, its efficiency can be considerably improved. Especially in the case of oil/water emulsions with a relatively large viscosity, a relatively high pressure is required.

Compact and efficient coalescence filters are known which make it absolutely necessary to press the condensate through under pressure. They are characterised in that they are built up of several layers of filter paper wrapped around a core.

In the direction of flow of the liquid through the filter material, the filter first contains a number of layers which collect dust particles floating in the liquid to be treated, followed by a number of layers of another filter medium which has to make sure that very fine oil drops are transformed into larger oil drops. Such a filter medium usually consists of a water-repellent material which has a good affinity for oil. The oil drops stick to the fibres of this material and collide with oil drops floating in the liquid. With each collision, the oil drop further grows until it is large enough to be carried along by the liquid flow against the adhesive force of the filter material.

It is natural to use the pressure of the compressor installation for this, and devices, are known in which the device for separating oil from the condensate is coupled directly to the condensate separators under pressure of the compressor installation.

In the case of such a known direct link, the compressor installation and the device may have a reciprocal influence on one another, which may be disadvantageous.

When for example a condensate separator lets compressed air through, this compressed air ends up in the device, so that separating oil becomes impossible.

When the separation device does not work flawlessly, for example because the coalescence filter is obstructed, the condensate separators can no longer discharge the condensate, so that the compressed air supplied by the installation will be no longer dry.

U.S. Pat. No. 4,608,160 describes a device for separating oil from water with a separation tank, followed by a coalescence filter, whereby a pump is provided between both which presses the water from the separation tank under pressure through the coalescence filter.

When such a device is used for separating oil from the condensate of a compressor installation, the device can be disconnected from the installation, and thus the condensate can be collected in a collector under atmospheric pressure and nevertheless be pumped under pressure through the coalescence filter. However, a pump must be added to such a device, which requires current and thus makes the construction relatively expensive and voluminous.

The invention aims a device for separating two non-mixable liquids with different specific gravities which does not have the above-mentioned disadvantages, which device can thus be made relatively compact and is relatively inexpensive, and with which, without a pump or other external means for supplying pressure being required, can be obtained a very efficient operation of the coalescence filter, so that the active carbon filter can be omitted or, in those cases where only an extremely low residual oil content is admitted, a possible active carbon filter will not be rapidly saturated.

In particular, the invention aims such a device which is particularly suitable for separating oil from the condensate of a compressor installation without having to be linked directly to this installation.

This aim is reached according to the invention in that the overflow onto which the coalescence filter is connected is situated higher than the inlet of the coalescence filter with a difference in height H1 which is such that the liquid mass in the pipe between the first separation tank and the coalescence filter provides for the necessary pressure to bridge the pressure drop in the coalescence filter and the counterpressure of the liquid in the second separation tank. DE 1.517.648 A discloses a device for separating oil and water. This device comprises two superposed chambers wherein filter element from synthetic foam with open cells are mounted.

The mixture of water and oil is pumped under pressure through a first filter in the upper chamber, flows then through an annular filter adjacent to the first filter. Oil is collected at the top of the upper chamber and pressed out of this chamber through a conduct.

The liquid with the remaining oil, passed through the second filter, flows over an overflow in the a space of the lower chamber situated around a third, annular filter. The space within this annular filer is closed at the top and inside this space is mounted a filter cartridge. The liquid is pressed through this cartridge from top to bottom and evacuated at the bottom of the lower chamber.

The oil separated from the water in the annular filter is collected at the top of said space and pressed out through a vertical conduct traversing also the upper chamber.

Preferably, the overflow for the liquid with the highest specific gravity of the first separation tank, even with a difference in height H2, is situated higher than the overflow for the liquid with the highest specific gravity in the second separation tank.

The above-mentioned difference in height H2, i.e. the height of the liquid column between the overflow for the liquid with the highest specific gravity, for example water, of the first separation tank and the overflow for the liquid with the highest specific gravity of the second separation tank, is then situated for example between several tens and hundreds of millimeters.

Of course, the pressure drop in the coalescence filter, which depends among others of the flow rate and the surface of the filter medium therein, is kept as low as possible.

To this end, also the first separation tank is preferably made such that it ensures a sufficiently long lingering period, so that the viscosity of the liquid flowing via the pipe to the coalescence filter is sufficiently low, so that the pressure drop is relatively small, for example less than 98 mbar.

This device can be connected to a collector in which the condensate of a compressor installation is collected and in which there is an atmospheric pressure, in which case the condensate is the liquid with the highest specific gravity and the other liquid to be separated is oil.

The device may contain an active carbon filter which is connected to the second separation tank.

For example in applications in which a very low oil content is required in the condensate of a compressor installation, the outlet for the water of the second separation tank can be connected to such an active carbon filter.

In the device according to the invention, the coalescence filter can be a very efficient one, as a result of which only a relatively small first separation tank or pre-separator is required which, when the liquid is condensate from a compressor, only aims to separate the free oil and the very heavy oil emulsion.

The device can then be separated in two separate and relatively compact components, namely the first separation tank on the one hand, and the coalescence filter with the second separation tank or post-separator coupled to it, and possibly the active carbon filter, on the other hand, which allows for an easy and compact built-in construction in for example the housing of a compressor.

The pipe between the first separation tank and the coalescence filter thus forms the connection between the two components and can be made flexibly, which makes it possible to provide the two compact components in different places, and which makes the above-mentioned integration in for example the compressor housing even easier, and which also makes it possible to easily adjust the difference in height H1 and thus automatically also H2.

In order to better explain the characteristics of the invention, the following preferred embodiment of a device for separating two non-mixable liquids with different specific gravities according to the invention is represented as an example only without being limitative in any way, with reference to the accompanying drawing which schematically represents such a device.

The device represented in the figure is a device for s separating oil from the condensate of a compressor installation which is collected in a collector 1 which is connected to the atmosphere, so that the oil/water emulsion which is collected in it is at atmospheric pressure. Thus, water is the liquid with the highest specific gravity.

The device itself mainly consists of a first separation tank 2, a coalescence filter 3 situated beneath it, a second separation tank 4 erected above this coalescence filter 3 and connected onto it, and an active carbon filter 5 connected onto the latter.

The first separation tank 2 is a typical liquid separator, based on the difference in specific gravity, and in the given example it contains a standing tank 6 containing a central, vertical overflow pipe 7 which is fixed to the bottom of the tank 6 and in which the collector 1 opens, and next to it a vertical partition 8 which is fixed to the walls of the tank 6 and thus extends from the top side of the tank 6 and thus from above the overflow pipe 7 up to under the top side of this overflow pipe 7 and up to a short distance from the bottom of the tank 6.

This partition 8 divides the inside of the tank 6 in two spaces 9 and 10, whereby the space 9 containing the overflow pipe 7 is provided with an overflow 11 for oil at the top, and the other space 10 is provided with a lower water overflow 12 onto which is connected a flexible or supple pipe 13 which connects this overflow 12 to the inlet 14 of the coalescence filter 3.

The first separation tank 2 is situated considerably higher than the coalescence filter 3, and there is a difference in height H1 between the overflow 12 and the inlet 14.

This coalescence filter 3 consists of a standing vessel 15 in which is erected a tubular filter element 16 which is closed at the bottom, for example as it is connected to the bottom of the vessel 15.

The filter element 16 contains or consists of filter material by which the emulgated oil is transformed into drops. It contains for example a number of outer layers which retain the dust particles in the water, and a number of layers made of a water-repellent material with a good affinity for oil which makes the oil drops glue together until they are sufficiently large to be carried along by the water to the second separation tank 4.

The above-mentioned inlet 14 opens in the space 17 around this filter element 16, whereas the space 18 opens inside this filter element 16 on top of the outlet 19.

Said outlet 19 opens at the bottom in an overflow pipe 20 of the second separation tank 4 which is erected directly above the coalescence filter 3 and which is built in the same manner as the above-described separation tank 2.

The overflow pipe 20 also stands on the bottom of a tank 21 and, next to this overflow pipe 20, at a small distance above said bottom, is erected a partition 22. The space 23 on one side of the partition 22 is provided with an overflow 24 for oil at the top, whereas the space 25 has a lower overflow 26 for water on the other side of the partition 22.

Between the water overflow 12 of the first separation tank 2 and the water overflow 26 of the second separation tank 4, there is a difference in height H2 which is situated for example between several tens and hundreds of millimeters.

The water overflow 26 is connected to the inlet of the active carbon filter 5, filled with active carbon, via a pipe 27.

The working of the above-described device is as follows:

Condensate from the compressor installation containing for example 100 to 5,000 mg oil per liter flows under atmospheric pressure from the collector 1 in the overflow pipe 7 of the first separation tank 2 and flows over this overflow pipe 7, whereby the free oil and the heavy oil emulsion are separated and start to float. At the top of the tank 6 is thus formed a layer 28 of free oil and heavy oil emulsion which is discharged via the overflow 11 as its thickness increases.

Only water with a fine oil emulsion and thus with relatively little oil and thus a relatively low viscosity can flow under the partition 8 into the space 10, from where this liquid flows over the overflow 12 and via the pipe 13 to the inlet 14 of the coalescence filter 3.

This water containing a little oil is pressed through the coalescence filter 3 under a pressure which is equivalent to a water column whose maximum height is equal to the difference in height H1 between the water overflow 12 or the water level in the first separation tank 2 and the inlet 14 of the coalescence filter 3, reduced, however, by the counterpressure caused by the liquid in the second separation tank 4, in other words a resulting maximum pressure which is approximately equal to a water column with the abovementioned height H2 or the difference in level between the water overflow 12 and the water overflow 26. The pressure which is caused by this water column having a height H2 is larger than the pressure drop over this coalescence filter 3, and the water column with a height H1 is sufficient to overcome not only this pressure drop, but also the counterpressure caused by the liquid in the second separation tank 4.

The above-mentioned pressure drop is smaller than for example 98 mbar (which is equivalent to a difference in height H2 of 1 m), thanks to the construction of the coalescence filter 3 and in particular the selection of the filter element 16 on the one hand, and thanks to the relatively small viscosity of the water with the oil on the other hand, as a result of a good separation of the free oil and the heavy oil emulsion owing to the construction of the first separation tank 2.

The major part of the oil which is still present and which has been glued together to drops by the coalescence filter 3, is separated from the water in the second separation tank 4. Especially while flowing over the overflow pipe 20, the oil will start floating and it will form a layer 29 at the top of the tank 21 which flows over via the overflow 24.

The practically pure water which contains less than 10 ppm of oil leaves the separation tank 4 via the space 25 and the overflow 26 and flows via the pipe 27 to the active carbon filter 5, where the final oil residues are adsorbed on the surface of the active carbon filter.

Without any pump or such being required, the condensate is pressed through a coalescence filter 3 under a sufficient pressure so as to bridge the pressure drop therein, so that this coalescence filter 3 can be made compact and can work efficiently.

The above-described device is not exclusively designed for separating oil from the condensate of a compressor installation; it can also be used for separating other liquids than water and oil, provided they cannot be mixed and have different specific gravities.

What is claimed is:

1. Device for separating two non-mixable liquids with different specific gravities, which device contains a first filterless separation tank (2) working under atmospheric pressure, with an overflow (11, 12) for each of the liquids to be separated, a coalescence filter (3) whose inlet (14) is connected via a pipe (13) to the overflow (12) of the first separation tank (2) for the liquid with the highest specific gravity and a second filterless separation tank (4) which is connected to the outlet (19) of the coalescence filter (3), characterised in that the overflow (12) onto which the coalescence filter (3) is connected is situated higher than the inlet (14) of the coalescence filter (3) with a difference in height H1 which is such that the liquid mass in the pipe between the first separation tank (2) and the coalescence filter (3) provides for the necessary pressure to bridge the pressure drop in the coalescence filter (3) and the counter-pressure of the liquid in the second separation tank (4).

2. Device according to claim 1, characterised in that the overflow (12) for the liquid with the highest specific gravity of the first separation tank (2), even with a difference in height H2, is situated higher than the overflow (26) for the liquid with the highest specific gravity of the second separation tank (4).

3. Device according to claim 2, characterised in that the device contains an active carbon filter (5) which is connected to the second separation tank (4).

4. Device according to claim 2, characterised in that the device is split into two separate and relatively compact components, namely the first separation tank (2) on the one hand, and the coalescence filter (3) with the second separation tank (4) connected onto it on the other hand, and possibly an active carbon filter (5).

5. Device according to claim 1, characterised in that the device is connected to a collector (1) in which the condensate of a compressor installation is collected and in which there is an atmospheric pressure, in which case the condensate is the liquid with the highest specific gravity and the other liquid to be separated is oil.

6. Device according to claim 5, characterised in that the device contains an active carbon filter (5) which is connected to the second separation tank (4).

7. Device according to claim 5, characterised in that the device is split into two separate and relatively compact components, namely the first separation tank (2) on the one hand, and the coalescence filter (3) with the second separation tank (4) connected onto it on the other hand, and possibly an active carbon filter (5).

8. Device according to claim 1, characterised in that the device contains an active carbon filter (5) which is connected to the second separation tank (4).

9. Device according to claim 8, characterised in that the device is split into two separate and relatively compact components, namely the first separation tank (2) on the one hand, and the coalescence filter (3) with the second separation tank (4) connected onto it on the other hand, and possibly an active carbon filter (5).

10. Device according to claim 1, characterised in that the device is split into two separate and relatively compact components, namely the first separation tank (2) on the one hand, and the coalescence filter (3) with the second separation tank (4) connected onto it on the other hand, and possibly an active carbon filter (5).

11. Device according to claim 10, characterised in that the pipe (13) between the first separation tank (2) and the coalescence filter (3) which thus forms the connection between the two components is flexible.

12. Device according to claim 1 wherein the two non-mixable liquids are oil and water.

13. Device according to claim 12, characterised in that the device is connected to a collector (1) in which the condensate of a compressor installation is collected and in which there is an atmospheric pressure, in which case the condensate is the liquid with the highest specific gravity and the other liquid to be separated is oil.

* * * * *